US012798813B2

(12) United States Patent
Li

(10) Patent No.: US 12,798,813 B2
(45) Date of Patent: Nov. 17, 2026

(54) GARBAGE CAN AND GARBAGE BAG CLOSING AND SEALING MECHANISM THEREFOR

(71) Applicant: AIRDEER (HANGZHOU) TECHNOLOGY CO., LTD., Hangzhou (CN)

(72) Inventor: Jun Li, Hangzhou (CN)

(73) Assignee: AIRDEER (HANGZHOU) TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 19/097,866

(22) Filed: Apr. 2, 2025

(65) Prior Publication Data

US 2025/0242959 A1 Jul. 31, 2025

Related U.S. Application Data

(63) Continuation of application No. PCT/CN2023/135826, filed on Dec. 1, 2023.

(30) Foreign Application Priority Data

Oct. 25, 2022 (CN) ......................... 202222821221.8

(51) Int. Cl.
*B65B 51/10* (2006.01)
*B65F 1/00* (2006.01)
*B65F 1/06* (2006.01)

(52) U.S. Cl.
CPC .............. *B65B 51/10* (2013.01); *B65F 1/002* (2013.01); *B65F 1/06* (2013.01); *B65F 2210/167* (2013.01)

(58) Field of Classification Search
CPC .. B65B 51/10; B65F 1/002; B65F 1/06; B65F 2210/167; B65F 1/14; Y02W 30/10
See application file for complete search history.

(56) References Cited

U.S. PATENT DOCUMENTS 5,280,880 A * 1/1994 Ewing ..................... B65B 11/08 254/294
5,918,447 A * 7/1999 Hanten ................ A22C 11/105 53/577

(Continued)

FOREIGN PATENT DOCUMENTS

CN 101238959 A * 8/2008 ............. Y02A 50/30
CN 105540103 A * 5/2016 ................ B65F 1/16

(Continued)

OTHER PUBLICATIONS

International Search Report of PCT Patent Application No. PCT/CN2023/135826 issued on Jan. 25, 2024.

*Primary Examiner* — Veronica Martin
*Assistant Examiner* — Mobeen Ahmed

(57) ABSTRACT

Provided are a garbage can and a garbage bag closing and sealing mechanism therefor. The mechanism comprises a base plate, a bag opening closure rod, a hot pressing rod, a winch motor, a reel, and a pull wire. One part of the pull wire is wound on the reel, and the other part of the pull wire is tensioned on the base plate by means of pulleys. The bag opening closure rod and the hot pressing rod are respectively fixed on the pull wire, and the winch motor drives the reel to rotate, so that the bag opening closure rod and the hot pressing rod are driven to move respectively by means of the pull wire. In this way, the mechanism uses the winch motor and the pull wire to drive both kinds of rods to move, resulting in features of simple structure, compact size and low cost.

18 Claims, 6 Drawing Sheets

(56) References Cited

U.S. PATENT DOCUMENTS

| | | | | | |
|---|---|---|---|---|---|
| 6,065,272 | A * | 5/2000 | Lecomte | B65F 1/062 53/567 |
| 6,449,928 | B1 * | 9/2002 | Huson | B65B 11/025 53/566 |
| 11,793,154 | B1 * | 10/2023 | Ban | B65B 57/00 |
| 12,478,032 | B2 * | 11/2025 | Hu | B65B 43/465 |
| 2002/0038535 | A1 * | 4/2002 | Jensen | B65B 9/15 53/567 |
| 2006/0010837 | A1 * | 1/2006 | Jurus | B65F 1/1607 53/436 |
| 2013/0019568 | A1 * | 1/2013 | Gkinosatis | B32B 27/16 53/450 |
| 2019/0152698 | A1 * | 5/2019 | Zhao | B65F 1/1638 |
| 2019/0382197 | A1 * | 12/2019 | Li | B65F 1/1415 |
| 2023/0182998 | A1 * | 6/2023 | Ge | B65F 1/06 220/495.06 |
| 2024/0025636 | A1 * | 1/2024 | Riggs | B65F 1/1607 |
| 2025/0270034 | A1 * | 8/2025 | Hoogland | B65B 9/15 |

FOREIGN PATENT DOCUMENTS

| | | | | | |
|---|---|---|---|---|---|
| CN | 105668081 | A | * | 6/2016 | B65F 1/14 |
| CN | 209382708 | U | * | 9/2019 | B65F 1/06 |
| CN | 210823836 | U | * | 6/2020 | B65B 51/10 |
| CN | 210883708 | U | * | 6/2020 | B65B 51/10 |
| CN | 212557737 | U | * | 2/2021 | B65B 51/10 |
| CN | 214166081 | U | * | 9/2021 | B65F 1/06 |
| CN | 218537962 | U | | 2/2023 | |

* cited by examiner

GARBAGE CAN AND GARBAGE BAG CLOSING AND SEALING MECHANISM THEREFOR

CROSS REFERENCE TO RELATED APPLICATIONS

The present application is a Continuation Application of PCT Application No. PCT/CN2023/135826 filed on Dec. 1, 2023, which claims the benefit of Chinese Patent Application No. 202222821221.8 filed on Oct. 25, 2022. All the above are hereby incorporated by reference in their entirety.

BACKGROUND OF THE INVENTION

Field of the Invention

A garbage bag closing and sealing mechanism for an automatic garbage can is provided.

Description of Related Art

Throwing garbage is an act in daily life with high frequency, and some frequent and repetitive acts related to the use of garbage cans, such as packing and changing the bag, are becoming more and more tedious and annoying for modern people living in a fast pace. There is a demand for garbage cans that can automatically pack, seal and change the bag. Many automatic garbage can designs that can automatically pack, seal and change the bag have been proposed.

Some inventions adopt pre-opened plastic film bag rolls, to facilitate automatic bag feeding. Such an automatic garbage can usually has a garbage bag storage device, with a flip lid thereon and a garbage bag sealing device thereunder, and the can body is below the sealing device. In addition, a bag feeding device is also provided, and arranged at the corresponding position of the garbage can according to the bag feeding method.

A plastic film bag roll as mentioned above is a long tube or long roll of plastic film, usually several meters to tens of meters long, packaged in a ring-shaped or ring-like packaging box, and can be drawn out at one end from the circumferential opening of the packaging box and sealed as the bottom of the previous garbage bag, with the inner hole of the ring-shaped packaging box as the entrance of garbage. When a bag is packed and sealed, a garbage bag sealing device will close the opening of the bag and performs hot melt cutting. This hot melt cutting operation generates two seals, the lower one is the seal of the previous garbage bag that is full with garbage, and the upper one is the bottom of the new garbage bag to be used. After the user takes out the previous garbage bag, the bag feeding device will automatically deploy a new garbage bag.

For such an automatic garbage can, it is required to close and hot melt seal the plastic film garage bag inside the garbage can, and this function is realized by a closing and sealing device. The closing and sealing device is the key component of a full-automatic garbage can, and it determines whether the basic functions such as sealing and cutting of the previous garbage bag and sealing the bottom of the new garbage bag can be realized stably and reliably.

So far, a variety of closing and sealing device designs have been released and disclosed. Most commonly, there are a pair of cross rods that can move and approach relatively in the X direction to close the garbage bag with a certain travel length in the X direction, and a pair of cross rods that can move and approach relatively in the Y direction orthogonal to the X direction to close and press the garbage bag in the Y direction, with an electric heating wire arranged on one cross rod in the Y direction cross bar, and an elastic body arranged on the other cross rod in Y direction. When the two cross rods in the Y direction press the plastic film garbage bag tightly, the heating wire is energized to hot melt seal and cut off the plastic film garbage bag. This structure is to close the plastic film garbage bag at the middle position of the opening of the garbage. It is required that the four cross rods move linearly, and there is a relatively high requirement for the rigidity of the cross rods in the Y direction. Therefore, this structure is complex, large in size, with relatively high cost.

Practices with a structure simpler than that mentioned above have also emerged in the market. That is, there is only one cross rod in the X direction, which can move to close the garbage bag to one side of the garbage bin in the X direction, and only one cross rod in the Y direction, which can move and press against a fixed rod arranged on the other side of the garbage bin in the Y direction, so as to close and hot melt seal the bag. This structure is to close the plastic film garbage bag to a certain corner of the opening of the garbage can, and it is relatively simple and small in size.

It is inevitable to use synchronous belts and positioning track rods for the closing and sealing mechanisms mentioned above and other closing and sealing designs. A track rod mentioned above is usually a stainless steel shaft or a galvanized steel shaft. One closing and sealing mechanism is provided with a plurality of synchronous belts and steel shafts, which is expensive and makes it more difficult to cut down the cost of the entire automatic garbage can.

SUMMARY OF THE INVENTION

Technical Problems

In order to solve the above technical problems, the purpose of the invention is to provide a garbage can and a garbage bag closing and sealing mechanism therefor, with no need of a plurality of synchronous belts or synchronous pulleys, and with no or less need of track rods, resulting in features of simple structure, compact size and low cost.

Solutions To Problems

The technical solution below is adopted in the invention to achieve the above-mentioned purpose:

A garbage bag closing and sealing mechanism, comprising:

a base plate, wherein a through-hole area in the middle thereof is the garbage inlet channel;

a bag opening closure rod for closing the garbage bag; and a hot pressing rod for heat-sealing of the garbage bag, further comprising:

a winch motor, wherein a reel is fixed on the output shaft of the winch motor; and a pull wire, wherein one part of the pull wire is wound on the reel, and the other part of the pull wire is tensioned on the base plate by means of a pulley; the bag opening closure rod and the hot pressing rod are respectively fixed on the pull wire, and the winch motor drives the reel to rotate forwards and backwards, so that the bag opening closure rod and the hot pressing rod are driven to move respectively by means of the pull wire.

Preferably, two ends of the pull wire are connected to form a closed loop, and the pull wire is fixedly connected to the reel.

Preferably, a first end of the pull wire is directly fixed on the reel, and the second end of the pull wire is pre-wound a plurality of rounds on the reel and then fixed on the reel; when the winch motor rotates forwards, a part of the pull wire at the first end is gradually wound onto the reel, and a part of the pull wire at the second end is gradually released from the reel; when the winch motor rotates backwards, the part of the pull wire at the first end wound on the reel is gradually released, and the part of the pull wire at the second end is gradually wound onto the reel. In this way, as the winch motor rotates, the pull wire moves linearly forwards or backwards along the boundary of the through-hole area. Both ends of the pull wire are fixed on the reel, so that, as the winch motor rotates, one part of the pull wire moves forwards and the other part of the pull wire moves backwards certainly.

Preferably, the through-hole area of the base plate is of a square or rectangle shape, and the pull wire is tensioned on pulleys and the reel to form a closed loop; the pulleys on which the pull wire is tensioned are provided at four corners of the through-hole area of the base plate; the two ends of the bag opening closure rod are fixed on the pull wire at the part moving along the X direction, and the two ends of the hot pressing rod are fixed on the pull wire at the part moving along the Y direction. In this way, the bag opening closure rod can be arranged in the X direction, and the hot pressing rod can be arranged in the Y direction. The two ends of the bag opening closure rod are fixed on the pull wire at the part moving along the X direction, and the two ends of the hot pressing rod are fixed on the pull wire at the part moving along the Y direction. As the winch motor rotates, the bag opening closure rod and the hot pressing rod can move linearly in their respective directions.

Preferably, the through-hole area of the base plate is of a square or rectangle shape, and the pull wire is tensioned on pulleys and the reel to form a closed loop; the pulleys on which the pull wire is tensioned are provided at three corners of the through-hole area of the base plate; one end of the bag opening closure rod is fixed on the pull wire at the part moving along the X direction, and one end of the hot pressing rod is fixed on the pull wire at the part moving along the Y direction; two track rods for guiding the movement of the bag opening closure rod and the hot pressing rod respectively are arranged on the base plate.

Preferably, the mechanism comprises two hot pressing rods and two bag opening closure rods; the two bag opening closure rods are driven by the pull wire to move towards each other, to close the garbage bag at the middle position of the can opening; the two hot pressing rods are driven by the pull wire to move towards each other, to cooperate with the bag opening closure rods and close the garbage bag at the middle position of the can opening; wherein one hot pressing rod is provided with an electric heating wire, the other hot pressing rod is provided with an elastomer, and the two hot pressing rods heat seal and cut off the garbage bag at the closed opening.

Preferably, the mechanism comprises one hot pressing rod and one bag opening closure rod; the bag opening closure rod is driven by the pull wire to close the garbage bag at one side of the can opening; at the same time, the hot pressing rod is driven by the pull wire, to cooperate with the bag opening closure rod and close the garbage bag at one corner of the can opening; the base plate is provided with an electric heating rod at the position corresponding to the hot pressing rod, the electric heating rod is provided with an electric heating wire, and the hot pressing rod is provided with an elastomer; the elastomer and the heating wire close together to heat seal and cut off the garbage bag at the closed opening.

Preferably, the mechanism comprises one hot pressing rod and two bag opening closure rods; the two bag opening closure rods are driven by the pull wire to move towards each other, and close the garbage bag at the middle position of the can opening; the base plate is provided with an electric heating rod at the position corresponding to the hot pressing rod, the electric heating rod is provided with an electric heating wire, and the hot pressing rod is provided with an elastomer; the pull wire drives the hot pressing rod to move to the position of the electric heating rod, so as to press the closed garbage bag against the electric heating wire on the electric heating rod, and complete the heat sealing and cut-off of the garbage bag.

All points on the same pull wire move at the same velocity and travel length. Therefore, it is necessary to ensure that the travel length of each bag opening closure rod mentioned above must be the same as that of each hot pressing rod mentioned above. Therefore, the can opening needs to be of a square shape. If two bag opening closure rods are provided, the travel length of each bag opening closure rod is half of the square's side length; at the same time, two hot pressing rods must be provided, so that the travel length of each hot pressing rod is also half of the square's side length. If only one bag opening closure rod is provided, the travel length of the bag opening closure rod is the square's side length; at the same time, only one hot pressing rod must be provided, so that the travel length of the hot pressing rod is also half of the square's side length.

If not of a square shape, the can opening can be designed as a rectangle shape, where the length of a longer side is twice that of a shorter side. Two bag opening closure rods are arranged in the direction along the longer side, a hot pressing rod is arranged in the direction along the shorter side, and an electric heating wire is installed on the edge of the base plate opposite to the hot pressing rod. This also enables the bag opening closure rods and the hot pressing rod to move synchronously, and the travel length of each bag opening closure rod is the same as that of the hot pressing rod.

For the design of automatic garbage cans with different sizes, different opening diameters and shapes, it is not necessary in practice to ensure a can opening of a square shape, or a rectangle shape where the length of a longer side is twice that of a shorter side. Therefore, the mechanism preferably comprises two independent pull wires, one to drive the bag opening closure rod(s) and the other to drive the hot pressing rod, so that the velocity and travel length of each bag opening closure rod and those of the hot pressing rod can be controlled independently, and there will be no such a constraint that the travel length of each bag opening closure rod must be the same as that of each hot pressing rod as in the case when only one pull wire is used. The two pull wires are driven by two winch motors respectively for more flexible control; or, the two pull wires are driven by one winch motor, for example the two pull wires can be driven by a winch motor with two output shafts, so the ratio of linear velocity between the two reels on the two output shafts respectively is equal to the ratio of required travel length between the bag opening closure rod and the hot pressing rod.

A garbage can, comprising a garbage bag closing mechanism as described above.

Beneficial Effects Of The Invention

With the technical solution above, the invention uses the winch motor and the pull wire to drive the bag opening closure rod and the hot pressing rod to move, with no need of a plurality of synchronous belts or synchronous pulleys, and with no or less need of track rods, resulting in features of simple structure, compact size and low cost.

BRIEF DESCRIPTION OF THE DRAWINGS

The drawings of the specification forming a part of the application are used to provide a further understanding of the application. The illustrative embodiments of the application and their descriptions are intended to be illustrative of the application and are not to be construed as limiting the application.

DESCRIPTION OF THE EMBODIMENTS

Best Embodiments Of The Invention

Figure 1:
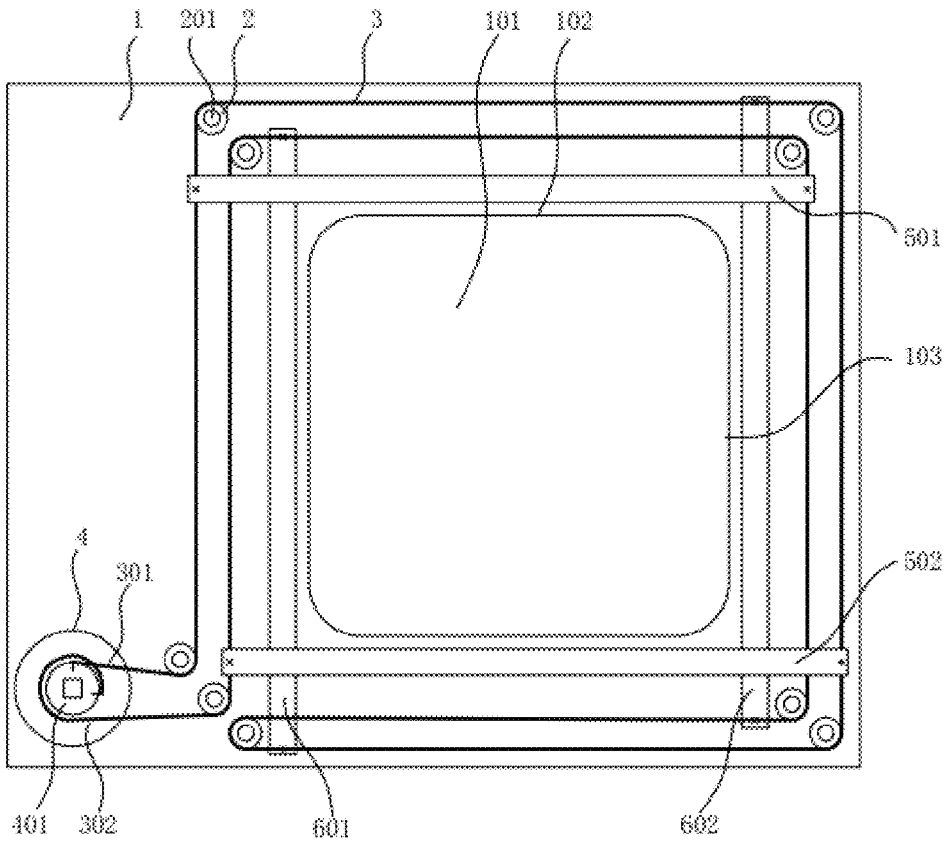
FIG. 1 is a structural diagram according to Embodiment 1.

The invention will be further described below with reference to figures and embodiments.

It should be noted that the following detailed description is illustrative, and is intended to provide further explanation of the application. Unless otherwise specified, all technical and scientific terms used herein have the same meaning as those commonly understood by common technical personnel in the technical field of this application.

Embodiments of the invention are described in detail below, examples of which are shown in the accompanying drawings, wherein identical or similar reference numerals throughout designate identical or similar elements or elements having identical or similar functions. The embodiments described below by reference to the accompanying drawings are exemplary and intended for use in explaining the invention, and shall not be construed as limiting the invention.

In the description of the invention, words in singular forms are intended to include the meaning in plural forms, unless the context clearly indicates otherwise. It should be further understood that the terms "comprises" and/or "comprising" when used in this specification, specify the presence of stated features, steps, operations, elements, components, and/or combinations thereof.

In the description of the invention, it needs to be understood that the azimuth or position relationships indicated by the terms "central", "longitudinal", "transverse", "length", "width", "thickness", "upper", "lower", "front", "rear", "left", "right", "vertical", "horizontal", "top", "bottom", "inside", "clockwise" and "counterclockwise" are based on those shown in the drawings. It is only for convenience of description and simplification of the present utility model, not to indicate or imply that the referred devices or components must have a specific orientation, be constructed and operate in a specific orientation, and thus cannot be understood as limiting the present utility model.

Furthermore, the terms "first" and "second" are used merely for illustrative purposes and shall not be construed as indicating or implying relative importance or as implicitly specifying the number of indicated technical features. Thus, the features defined with the terms "first" and "second" may explicitly or implicitly include one or more of these features. Unless otherwise specifically defined, "a plurality of" means two or more in the description of the invention.

In the invention, unless otherwise specified or restricted, the terms of "installation", "interconnection", "connection" and "fixing" shall be understood in a general sense. For example, the connection can be fixed connection, removable connection, integrated connection, mechanical connection, electrical connection, direct connection, indirect connection through intermediate media or connection between two components. Persons of ordinary skill in the art can understand the specific meanings of the above terms in the invention as appropriate.

In the invention, unless otherwise explicitly specified and restricted, "a first feature above or below a second feature" may include "direct contact between the first feature and the second feature", and may also include that "the first feature and the second feature are not in direct contact but they are in contact through other features between them". Besides, the first feature "above", "on top of" and "onto" the second feature includes that the first feature is directly above and obliquely above the second feature, or simply indicates that the first feature is higher in the level than the second feature. The first feature "below", "at the bottom of" and "underneath" the second feature includes that the first feature is directly below and obliquely below the second feature, or simply means that the first feature is lower in the level than the second feature.

Embodiment 1

A garbage bag closing and sealing mechanism as shown in FIG. 1, comprising a base plate 1, wherein the through-hole area 101 in the middle thereof is the garbage channel. The bottom plate of the garbage bag storage device is usually used as the base plate of the closing and sealing device. For ease of arrangement, the through-hole area is typically of an approximately square or rectangle shape. A plurality of pulleys 2 are provided at the four corners of the through-hole area, and the pulleys 2 are rotatably mounted on a pulley shaft 201, which is fixed to the base plate 1. A pull wire 3 is tensioned on the pulleys 2. The pull-wire 3 is arranged in a direction parallel to the side 102 and the side 103 of the through-hole area 101, and the two directions mentioned are defined as the X direction and the Y direction respectively. A winch motor 4 is also provided, wherein a reel 401 is fixed on the output shaft of the winch motor 4.

Figure 2:
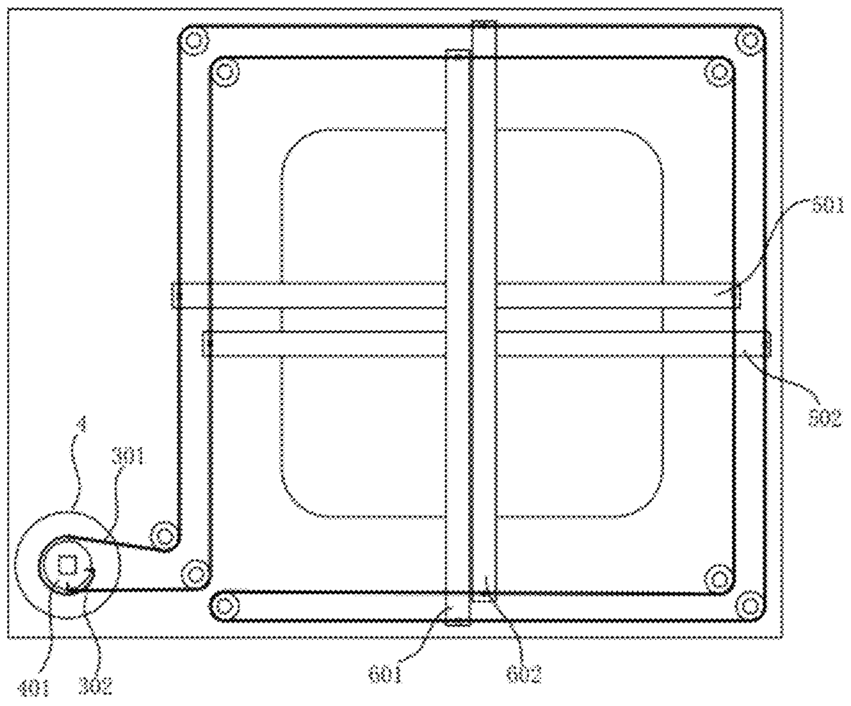
FIG. 2 is a schematic diagram according to Embodiment 1 in a heat-sealed state.

A first end 301 of the pull wire is directly fixed to the reel 401, and a second head 302 of the pull wire is pre-wound a plurality of turns on the reel 401 and then fixed on the reel. Initially in the state as shown in FIG. 1, when the winch motor 4 rotates forwards, namely in the counterclockwise direction shown in FIG. 1, a part of the pull wire at the first end 301 is gradually wound onto the reel, and a part of the pull wire at the second end 302 is gradually released from the reel 401. Initially in the state as shown in FIG. 2, when the winch motor rotates backwards, namely in the clockwise direction shown in FIG. 2, the part of the pull wire at the first end 301 wound on the reel is gradually released, and the part of the pull wire at the second end 302 is gradually wound onto the reel. As the winch motor 4 rotates, the pull wire 3 moves linearly forwards or backwards along the boundary of the through-hole area. Both ends of the pull wire are fixed on the reel, so that, as the winch motor rotates, one part of the pull wire moves forwards and the other part of the pull wire moves backwards certainly.

The garbage bag closing and sealing mechanism is further provided with bag opening closure rods 501, 502 and hot pressing rods 601, 602. According to the actual structural requirements, the bag opening closure rods can be arranged in the X direction, and the hot pressing rods can be arranged in the Y direction. The two ends of each bag opening closure rod are fixed on the pull wire at the part moving along the X direction, and the two ends of each hot pressing rod are fixed on the pull wire at the part moving along the Y direction. In this way, as the winch motor rotates, the bag opening closure rods and the hot pressing rods can move linearly in their respective directions.

This embodiment is provided with two bag opening closure rods 501 and 502, which are driven by the pull wire to move towards each other, and at the same time, two hot pressing rods 601 and 602, which are driven by the pull wire to move towards each other, to cooperate with the bag opening closure rods and close the garbage bag at the middle position of the can opening. Furthermore, one hot pressing rod is provided with an electric heating wire, and the other hot pressing rod is provided with an elastomer. After the pull wire is fully tensioned by the forward rotation of the winch motor 4, the two hot pressing rods press with each other tightly and close the garbage bag opening at the middle position of the can opening. At this time, the electric heating wire is energized to heat-seal and cut off the garbage bag at the closed opening, as shown in FIG. 2.

The bag opening closure rods and the hot pressing rods are fixed by the pull wire in parallel to the plane of the base plate and can be stressed; but are just preliminarily positioned by the pull wire in the direction perpendicular to the plane of the base plate, and may deviate after being stressed. As the mechanism on the base plate further needs to be covered by a lid, positioning bars are arranged at both ends of the bag opening closure rods and the hot pressing rods on the base plate and the lid as boundaries between the bag opening closure rods and the hot pressing rods in the direction perpendicular to the plane of the base plate. In this way, the bag opening closure rods and the hot pressing rods can only move in the direction parallel to the plane of the base plate, with only a small gap in the direction perpendicular to the plane of the base plate, but no large deviation.

This embodiment also discloses a garbage can, which adopts the above-mentioned garbage bag closing and sealing mechanism.

Embodiment 2

In actual design, less number of pulleys and a shorter pull wire may be considered, and the bag opening closure rods and the hot pressing rod can be driven with just one end fixed.

Figure 3:
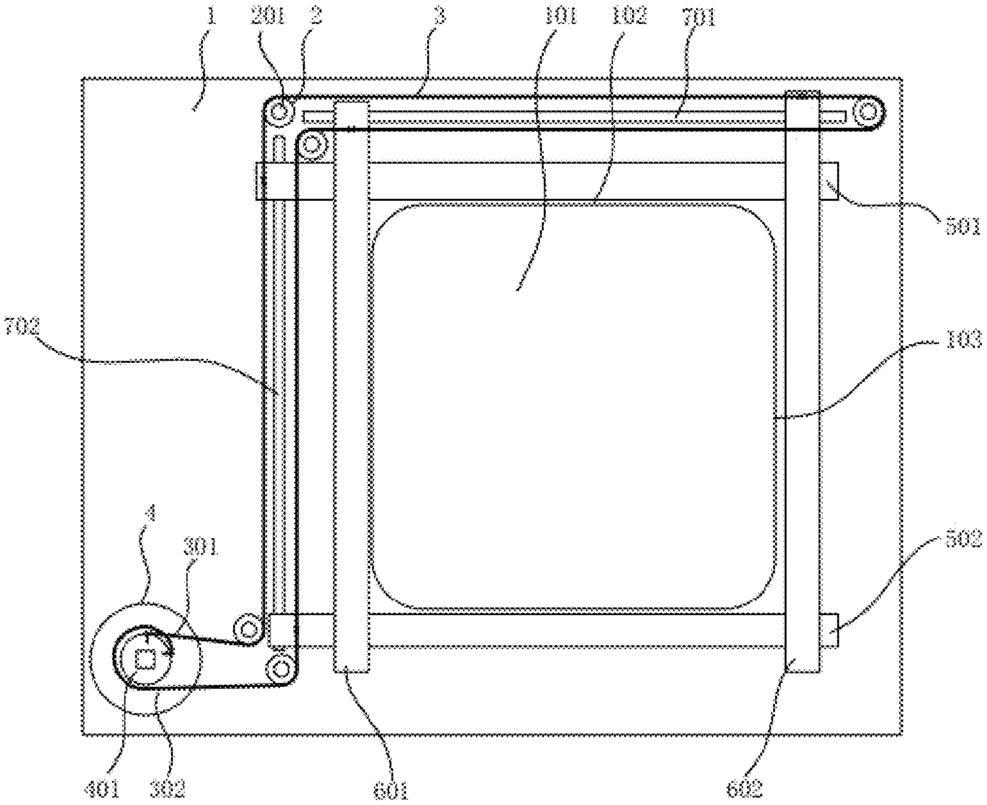
FIG. 3 is a structural diagram according to Embodiment 2.

For a garbage bag closing and sealing mechanism as shown in FIG. 3, each of the bag opening closure rods 501, 502 and each of the hot pressing rods 601, 602 are fixed at just one end on the pull wire, and the other end of each rod does not need to be driven by the pull wire. In this way, the pull wire need only be arranged on two sides of the can opening, namely two adjacent sides of the through-hole area 101, for a shorter length of the pull wire and less number of pulleys. However, track rods for positioning and guidance are need by such bag opening closure rods and hot pressing rods. On each of the bag opening closure rods 501 and 502, a hole is provided at the end fixed to the pull wire 3, so that the track rod 702 passes through the hole, and the bag opening closure rods 501 and 502 are slidably fixed on the track rod 702; in the same way, the hot pressing rods 601 and 602 are also slidably fixed on the track rod 701. This embodiment simplifies the pull wire and pulleys, but at a slightly higher cost because of the use of metal track rods.

Other structures are the same as those in Embodiment 1 or are set with reference to Embodiment 1.

This embodiment also discloses a garbage can, which adopts the above-mentioned garbage bag closing and sealing mechanism.

Embodiment 3

The bag opening closure rod and the hot pressing rod are fixed on the same pull wire, and certainly have the same velocity and travel length. Therefore, it is necessary to make sure that the travel length of each bag opening closure rod is the same as that of each hot pressing rod when the closing and sealing mechanism operates from the standby state to the sealing state. For a can opening of a square shape, the travel length in the X direction and that in the Y direction are the same, and the number of bag opening closure rod moving in the X direction and the number of hot pressing rod moving in the Y direction must also be the same. In the above embodiments, two bag opening closure rods and two hot pressing rods are used, and the travel length of each bag opening closure rod and that of each hot pressing rod is typically half of the side length of the can opening. For a simpler structure, it is possible to provide only one bag opening closure rod and one hot pressing rod. In this way, the travel length of the bag opening closure rod and that of the hot pressing rod is approximately the side length of the can opening.

Figure 4:
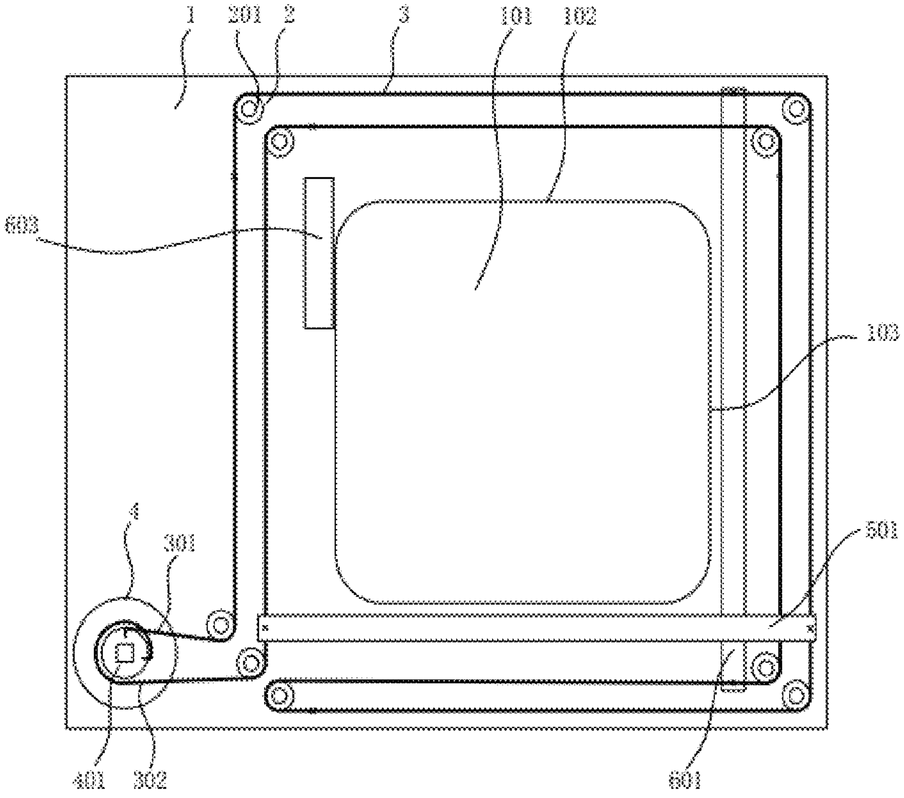
FIG. 4 is a structural diagram according to Embodiment 3.
Figure 5:
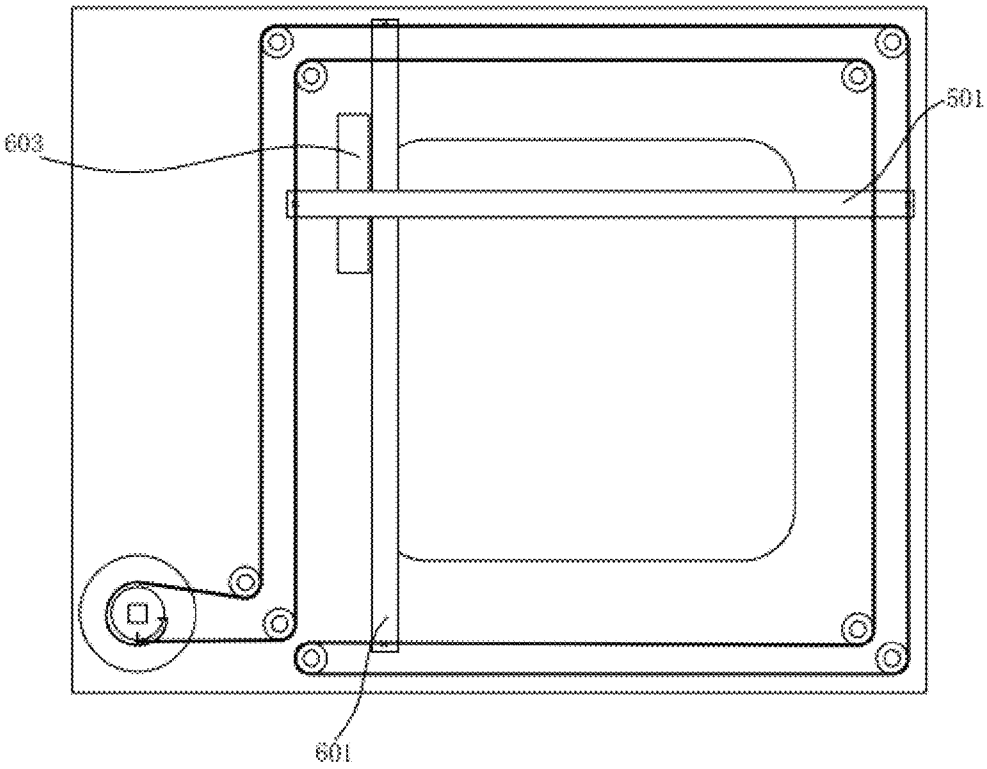
FIG. 5 is a schematic diagram according to Embodiment 3 in a heat-sealed state.

For a garbage bag closing and sealing mechanism as shown in FIG. 4, the pull wire 3 is arranged in the same pattern as in Embodiment 1, but only one bag opening closure rod 501 and one hot pressing rod 601 are provided, and an electric heating rod 603 with an electric heating wire is also needed. When the winch motor 4 rotates counterclockwise, the bag opening closure rod 501 can be driven to close the garbage bag towards the edge 102, and at the same time, the hot pressing rod 601 can be driven to close the garbage bag towards the electric heating rod 603. Finally, the bag opening closure rod and the hot pressing rod cooperate to close the garbage bag to the upper left corner of the can opening 101. After the hot pressing rod 601 presses the closed garbage bag to the electric heating rod 603, the electric heating wire on the electric heating rod 603 is energized to seal and cut off the garbage bag, as shown in FIG. 5.

Other structures are the same as those in Embodiment 1 or are set with reference to Embodiment 1.

This embodiment also discloses a garbage can, which adopts the above-mentioned garbage bag closing and sealing mechanism.

Embodiment 4

Figure 6:
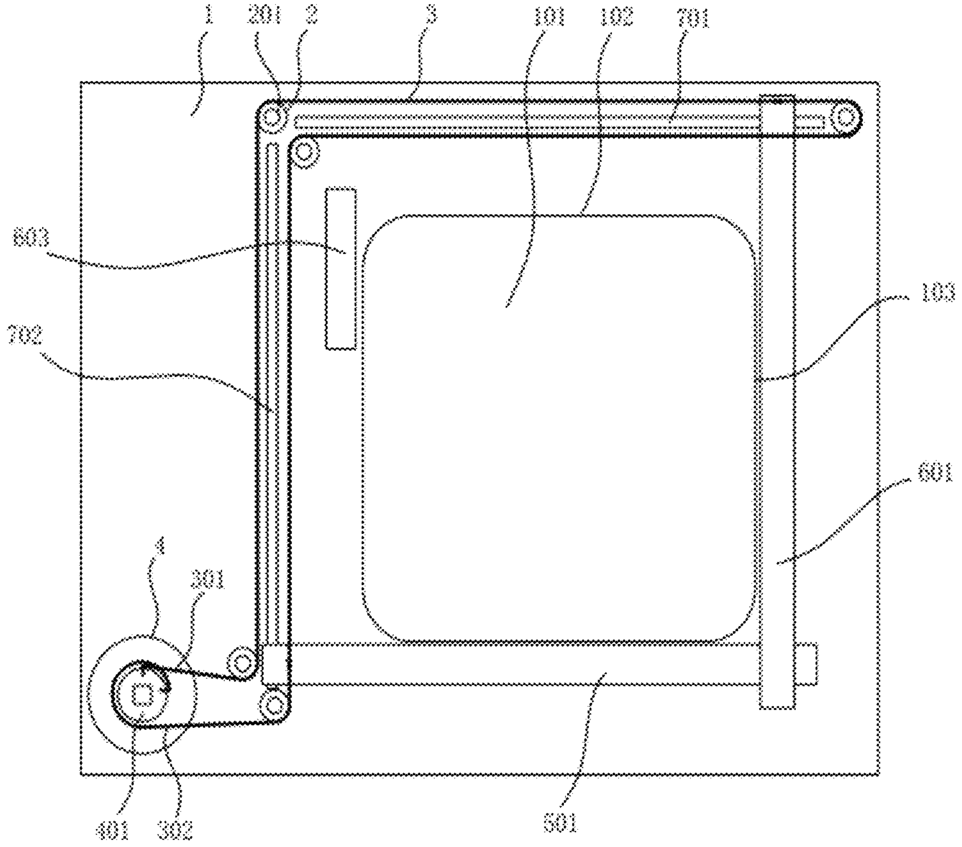
FIG. 6 is a structural diagram according to Embodiment 4.

For a garbage bag closing and sealing mechanism as shown in FIG. 6, when a simpler arrangement of pull wire as in Embodiment 2 is adopted, it is possible to provide only one bag opening closure rod 501 and one hot pressing rod 601. Due to such a simpler arrangement of pull wire and pulleys, additional track rods 701 and 702 are needed.

Other structures are the same as those in Embodiment 2 or are set with reference to Embodiment 2.

This embodiment also discloses a garbage can, which adopts the above-mentioned garbage bag closing and sealing mechanism.

Embodiment 5

Besides the structure with two bag opening closure rods and two hot pressing rods or the structure with only one bag opening closure rod and one hot pressing rod as mentioned above, it is also common to adopt a structure with two bag opening closure rods and one hot pressing rod. If a pull wire is used to drive the two bag opening closure rods and the hot pressing rod at the same time, the travel length of the hot pressing rod should be the same as that of each bag opening closure rod from the standby state to the heat-sealing state, so the can opening should be of approximately a rectangle shape with the length of a longer side being twice that of a shorter side.

Figure 7:
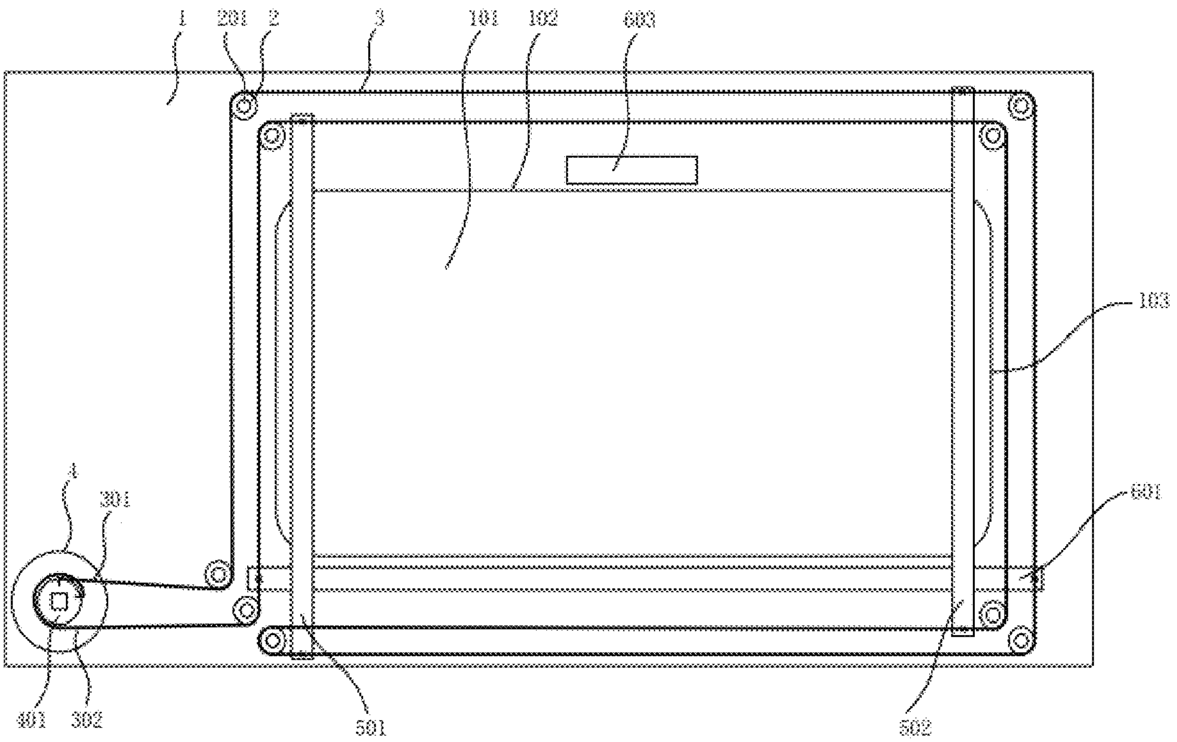
FIG. 7 is a structural diagram according to Embodiment 5.

For a garbage bag closing and sealing mechanism as shown in FIG. 7, the can opening 101 is of approximately rectangular, with the length of the side 102 being about 2 times that of the side 103. The bag opening closure rods 501 and 502 are arranged to move along the longer side 102, and the hot pressing rod 601 is arranged to move along the shorter side 103. When the winch motor 4 rotates counter-clockwise, the pull wire 3 drives the bag opening closure rods 501 and 502 to move towards each other to close the garbage bag at the middle position of the can opening 101; at the same time, the pull wire 3 drives the hot pressing rod 601 to move to the electric heating rod 603, so that the closed garbage bag is pressed against the electric heating wire on the electric heating rod 603 to complete the heat sealing of the garbage bag.

Other structures are the same as those in Embodiment 1 or are set with reference to Embodiment 1.

This embodiment also discloses a garbage can, which adopts the above-mentioned garbage bag closing and sealing mechanism.

Embodiment 6

One pull wire is used to drive the bag opening closure rod(s) and the hot pressing rod at the same time, and the proportional relationship between the travel length of each bag opening closure rod and that of the hot pressing rod is constrained, thereby constraining the shape of the can opening.

For the design of automatic garbage cans with different sizes, different opening diameters and shapes, it is not necessary in practice to ensure a can opening of approximately a square shape, or approximately a rectangle shape where the length of a longer side is twice that of a shorter side. For such a design, two independent pull wires can be used, one to drive the bag opening closure rod(s) and the other to drive the hot pressing rod, so that the velocity and travel length of each bag opening closure rod and those of the hot pressing rod can be controlled independently, and there will be no such a constraint on the constant proportional relationship between the travel length of each bag opening closure rod and that of each hot pressing rod as in the case when only one pull wire is used. The two pull wires can be driven by two winch motors respectively to realize more flexible control.

Figure 8:
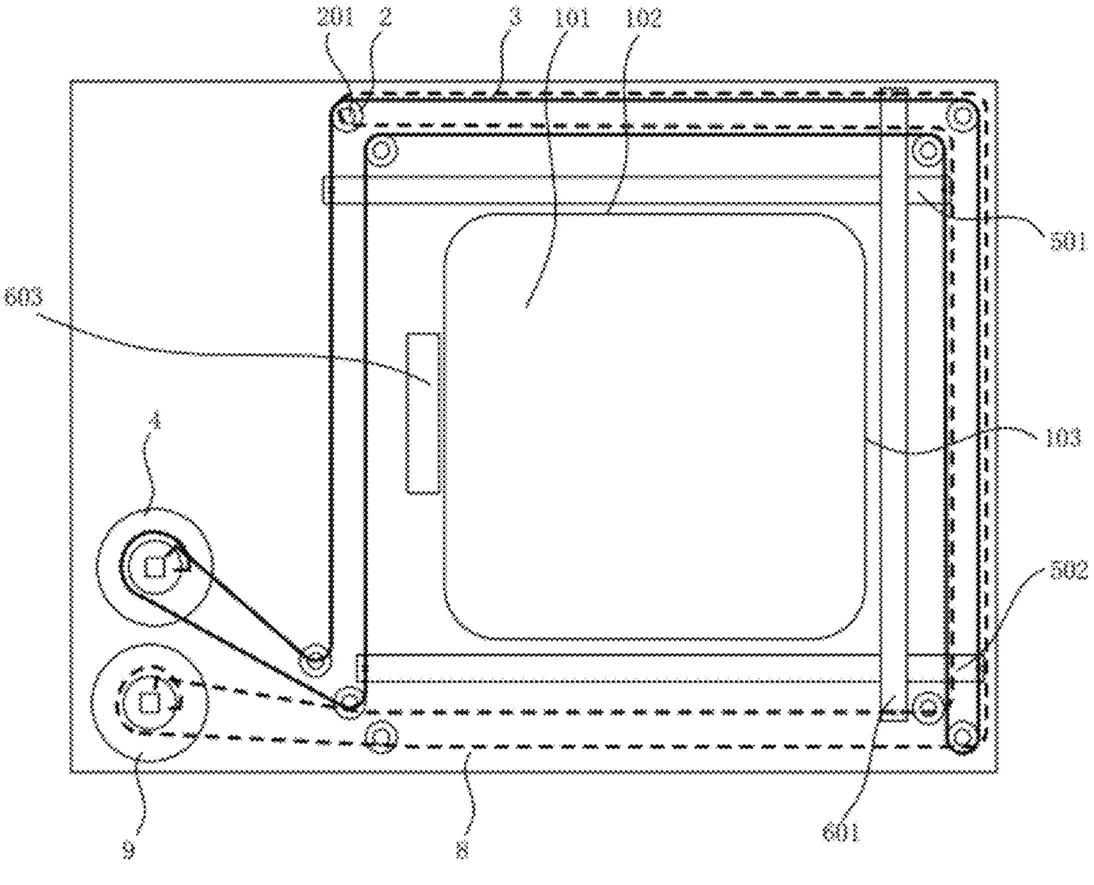
FIG. 8 is a structural diagram according to Embodiment 6.
Figure 9:
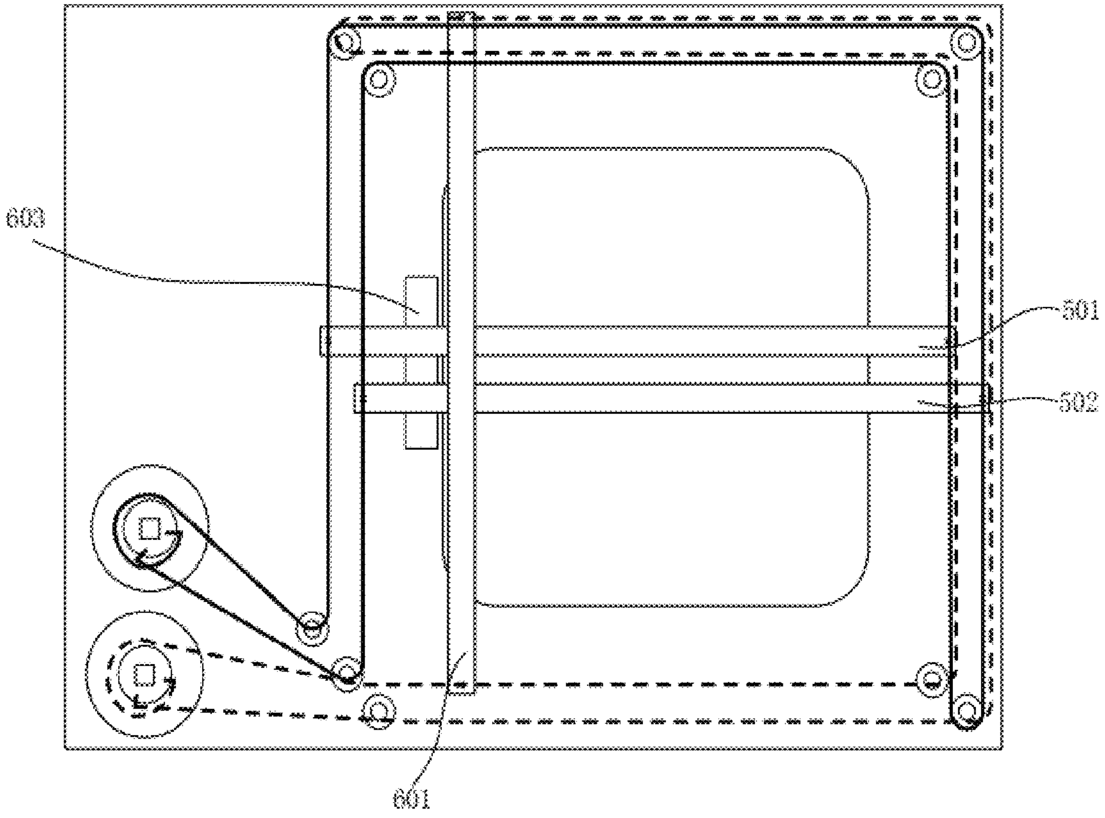
FIG. 9 is a schematic diagram according to Embodiment 6 in a heat-sealed state.

For a garbage bag closing and sealing mechanism as shown in FIG. 8, one pull wire 3 is driven by the winch motor 4 to drive the bag opening closure rods 501 and 502, and the other pull wire 8 is driven by the winch motor 9 to drive the hot pressing rod 601. The pull wire 3 and the pull wire 8 in FIG. 8 are shown in a staggered manner for clarity, and in fact, they are arranged with one above the other. At any position where both the pull wire 3 and the pull wire 8 are tensioned on the pulleys accordingly, the two pulleys are mounted with one above the other, one to position the pull wire 3 and the other to position the pull wire 8. When the winch motor 4 rotates counterclockwise, it drives the bag opening closure rods 501 and 502 to close the garbage bag towards the middle position of the can opening; at the same time, the winch motor 9 also rotates counterclockwise, to drive the hot pressing rod 601 to close the garbage bag to the electric heating rod 603, and finally press the closed opening of the garbage bag against the electric heating wire for electric heat sealing, as shown in FIG. 9.

In this way, the bag opening closure rods and the hot pressing rod move independently without a constant proportional relationship, so the sizes of the side 102 and the side 103 of the can opening can be flexibly designed, to provide automatic garbage can products of different shapes and sizes as needed by users.

Figure 10:
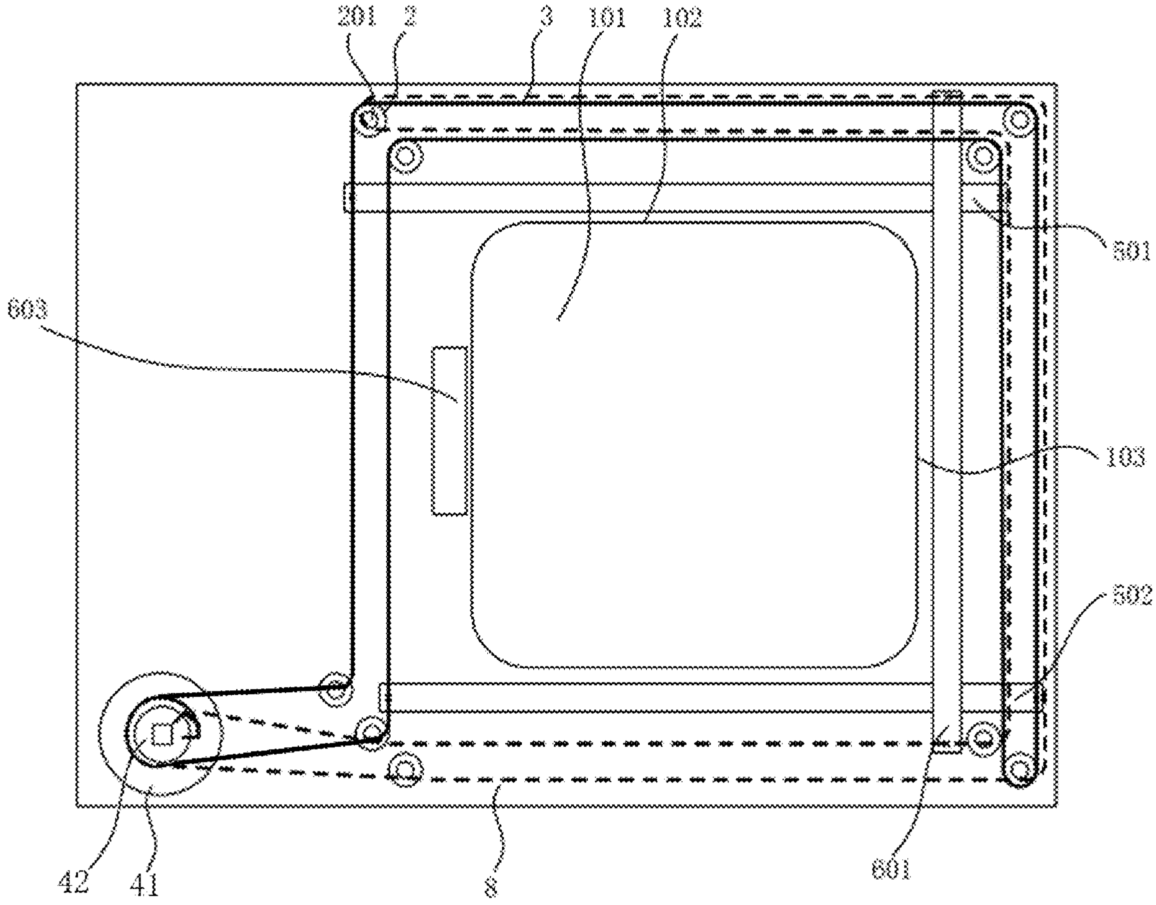
FIG. 10 is a schematic diagram showing one winch motor having two reels.

In order to further reduce the cost, it is also possible to provide one winch motor 41 with two output shafts, one to drive the pull wire 3, and the other to drive the pull wire 8, so the ratio of linear velocity between the two reels 42, 43 (see FIG. 10) on the two output shafts respectively is equal to the ratio of required travel length between the bag opening closure rod and the hot pressing rod.

In the description of the specification, descriptions with reference to the terms “an embodiment”, “some embodiments”, “an embodiment mode”, “specific embodiment mode”, “other embodiment modes”, “example”, “specific example”, or “some examples” mean that specific features, structures, materials or characteristics described in combination with the embodiment or example are contained in at least one embodiment, embodiment mode or example of the invention. In the specification, the schematic expressions of the above terms do not necessarily refer to the same embodiments or examples. Moreover, the specific features, structures, materials, or characteristics described above may also be combined in any one or more embodiments, embodiment modes or examples in a suitable manner. The technical solution recorded in the invention also includes the combination of any one or more specific features, structures, materials or characteristics described above in a single or combined manner to form more technical solutions.

Although the embodiments of the invention have been shown and described above, it can be understood that the above embodiments are exemplary and cannot be construed as limitations to the invention. Those skilled in the art may make changes, modifications, substitutions, variations, deletions, addition or recombination of features to the above embodiments within the scope of the invention without departing from the principle and purpose of the invention to form technical solutions. Any simple modifications, equivalent changes and modifications made to the above embodiments according to the innovative principle of the invention fall within the claimed scope of the technical solution of the invention.

What is claimed is:

1. A garbage bag closing and sealing mechanism, comprising:

a base plate, wherein a through-hole area in a middle thereof is a garbage inlet channel;

at least one bag opening closure rod for closing a garbage bag; and at least one hot pressing rod for heat-sealing of the garbage bag, wherein the mechanism further comprises:

a winch motor, wherein a reel is fixed on an output shaft of the winch motor; and a pull wire, wherein one part of the pull wire is wound on the reel, and the other part of the pull wire is tensioned on the base plate by means of pulleys; the at least one bag opening closure rod and the at least one hot pressing rod are respectively fixed on the pull wire, and the winch motor drives the reel to rotate forwards and backwards, so that the at least one bag opening closure rod and the at least one hot pressing rod are driven to move respectively by means of the pull wire;

wherein a first end of the pull wire is directly fixed to the reel, and a second end of the pull wire is pre-wound for a plurality of rounds on the reel and then fixed to the reel; when the winch motor rotates forwards, a portion of the pull wire at the first end is gradually wound onto the reel, and a portion of the pull wire at the second end is gradually unwound from the reel; when the winch motor rotates backwards, the portion of the pull wire at the first end is gradually unwound from the reel, and the portion of the pull wire at the second end is gradually re-wound onto the reel.

2. A garbage can, wherein the garbage can comprises the garbage bag closing and sealing mechanism according to claim 1.

3. The garbage bag closing and sealing mechanism according to claim 1, wherein the winch motor is configured to rotate and move the pull wire linearly forwards or backwards along a boundary of the through-hole area.

4. The garbage bag closing and sealing mechanism according to claim 1, wherein the through-hole area of the base plate is of a square or rectangle shape, and the pulleys on which the pull wire is tensioned are provided at four corners of the through-hole area of the base plate;

wherein a first end and an opposite second end of the at least one bag opening closure rod are fixed on two parts of the pull wire that move along an X direction and are located at two opposite sides of the through-hole area, respectively; and a first end and an opposite second end of the at least one hot pressing rod are fixed on two parts of the pull wire that move along a Y direction and are located at another two opposite sides of the through-hole area, respectively; the X direction and the Y direction being perpendicular to each other and parallel to a plane of the base plate.

5. The garbage bag closing and sealing mechanism according to claim 1, wherein the at least one hot pressing rod is two hot pressing rods and the at least one bag opening closure rod is two bag opening closure rods; the two bag opening closure rods are driven by the pull wire to move towards each other, to close the garbage bag at a middle position of the garbage inlet channel; the two hot pressing rods are driven by the pull wire to move towards each other, to cooperate with the bag opening closure rods and close the garbage bag at the middle position of the garbage inlet channel; wherein one hot pressing rod is provided with an electric heating wire, the other hot pressing rod is provided with an elastomer, and the two hot pressing rods heat seal and cut off the garbage bag at the middle position of the garbage inlet channel.

6. The garbage bag closing and sealing mechanism according to claim 1, wherein the at least one hot pressing rod is one hot pressing rod and the at least one bag opening closure rod is one bag opening closure rod; the bag opening closure rod is driven by the pull wire to close the garbage bag at one side of the garbage inlet channel; at the same time, the hot pressing rod is driven by the pull wire, to cooperate with the bag opening closure rod and close the garbage bag at one corner of the garbage inlet channel; the base plate is provided with an electric heating rod at a position corresponding to the hot pressing rod, the electric heating rod is provided with an electric heating wire, and the hot pressing rod is provided with an elastomer; the elastomer and the heating wire close together to heat seal and cut off the garbage bag at the one corner of the garbage inlet channel.

7. The garbage bag closing and sealing mechanism according to claim 1, wherein the at least one hot pressing rod is one hot pressing rod and the at least one bag opening closure rod is two bag opening closure rods; the two bag opening closure rods are driven by the pull wire to move towards each other, and close the garbage bag at a middle position of the garbage inlet channel; the base plate is provided with an electric heating rod at a position corresponding to the hot pressing rod, the electric heating rod is provided with an electric heating wire, and the hot pressing rod is provided with an elastomer; the pull wire drives the hot pressing rod to move to the position of the electric heating rod, so as to press the closed garbage bag against the electric heating wire on the electric heating rod, and complete heat sealing and cut-off of the garbage bag.

8. The garbage bag closing and sealing mechanism according to claim 1, wherein the through-hole area of the base plate is of a square or rectangle shape, and the pulleys on which the pull wire is tensioned are provided at three corners of the through-hole area of the base plate;

wherein one end of the at least one bag opening closure rod is fixed on one part of the pull wire that moves along an X direction, and one end of the at least one hot pressing rod is fixed on one part of the pull wire that moves along a Y direction, the X direction and the Y direction being perpendicular to each other and parallel to a plane of the base plate; and wherein two track rods for guiding movement of the at least one bag opening closure rod and the at least one hot pressing rod respectively are arranged on the base plate.

9. A garbage bag closing and sealing mechanism, comprising:

a base plate, wherein a through-hole area in a middle thereof is a garbage inlet channel;

at least one bag opening closure rod for closing a garbage bag;

at least one hot pressing rod for heat-sealing of the garbage bag;

a winch motor, wherein a reel is fixed on an output shaft of the winch motor; and a pull wire, wherein one part of the pull wire is wound on the reel, and the other part of the pull wire is tensioned on the base plate by means of pulleys; the at least one bag opening closure rod and the at least one hot pressing rod are respectively fixed on the pull wire, and the winch motor drives the reel to rotate forwards and backwards, so that the at least one bag opening closure rod and the at least one hot pressing rod are driven to move respectively by means of the pull wire;

wherein the through-hole area of the base plate is of a square or rectangle shape, and the pulleys on which the pull wire is tensioned are provided at four corners of the through-hole area of the base plate;

wherein a first end and an opposite second end of the at least one bag opening closure rod are fixed on two parts of the pull wire that move along an X direction and are located at two opposite sides of the through-hole area, respectively; and a first end and an opposite second end of the at least one hot pressing rod are fixed on two parts of the pull wire that move along a Y direction and are located at another two opposite sides of the through-hole area, respectively; the X direction and the Y direction being perpendicular to each other and parallel to a plane of the base plate.

10. The garbage bag closing and sealing mechanism according to claim 9, wherein the pull wire is tensioned on the pulleys and the reel to form a closed loop.

11. The garbage bag closing and sealing mechanism according to claim 9, wherein the at least one hot pressing rod is two hot pressing rods and the at least one bag opening closure rod is two bag opening closure rods; the two bag opening closure rods are driven by the pull wire to move towards each other, to close the garbage bag at a middle position of the garbage inlet channel; the two hot pressing rods are driven by the pull wire to move towards each other, to cooperate with the bag opening closure rods and close the garbage bag at the middle position of the garbage inlet channel; wherein one hot pressing rod is provided with an electric heating wire, the other hot pressing rod is provided with an elastomer, and the two hot pressing rods heat seal and cut off the garbage bag at the middle position of the garbage inlet channel.

12. The garbage bag closing and sealing mechanism according to claim 9, wherein the at least one hot pressing rod is one hot pressing rod and the at least one bag opening closure rod is one bag opening closure rod; the bag opening closure rod is driven by the pull wire to close the garbage bag at one side of the garbage inlet channel; at the same time, the hot pressing rod is driven by the pull wire, to cooperate with the bag opening closure rod and close the garbage bag at one corner of the garbage inlet channel; the base plate is provided with an electric heating rod at a position corresponding to the hot pressing rod, the electric heating rod is provided with an electric heating wire, and the hot pressing rod is provided with an elastomer; the elastomer and the heating wire close together to heat seal and cut off the garbage bag at the one corner of the garbage inlet channel.

13. The garbage bag closing and sealing mechanism according to claim 9, wherein the at least one hot pressing rod is one hot pressing rod and the at least one bag opening closure rod is two bag opening closure rods; the two bag opening closure rods are driven by the pull wire to move towards each other, and close the garbage bag at a middle position of the garbage inlet channel; the base plate is provided with an electric heating rod at a position corresponding to the hot pressing rod, the electric heating rod is provided with an electric heating wire, and the hot pressing rod is provided with an elastomer; the pull wire drives the hot pressing rod to move to the position of the electric heating rod, so as to press the closed garbage bag against the electric heating wire on the electric heating rod, and complete heat sealing and cut-off of the garbage bag.

14. The garbage bag closing and sealing mechanism according to claim 9, wherein the mechanism comprises two independent pull wires, one of which drives the at least one bag opening closure rod and the other drives the at least one hot pressing rod; the two pull wires are driven respectively by two reels commonly driven by the winch motor.

15. A garbage bag closing and sealing mechanism, comprising:

a base plate, wherein a through-hole area in a middle thereof is a garbage inlet channel;

at least one bag opening closure rod for closing a garbage bag;

at least one hot pressing rod for heat-sealing of the garbage bag;

two winch motors, each having a reel fixed on an output shaft thereof; and first and second pull wires respectively driven by the two winch motors and configured to move independently of each other, each pull wire having a first part wound on the respective reel and a second part tensioned on the base plate by means of pulleys;

wherein the at least one bag opening closure rod is fixed on the first pull wire and the at least one hot pressing rod is fixed to the second pull wire, and the two winch motors are configured to drive the first and second pull wires respectively with different velocities and travel lengths relative to each other, thereby accommodating garbage inlet channels of different shapes and sizes.

16. The garbage bag closing and sealing mechanism according to claim 15, wherein the first pull wire and the second pull wire are arranged such that one is positioned above the other.

17. The garbage bag closing and sealing mechanism according to claim 15, wherein a first end and an opposite second end of the at least one bag opening closure rod are fixed on two parts of the first pull wire that move along an X direction and are located at two opposite sides of the through-hole area, respectively; and a first end and an opposite second end of the at least one hot pressing rod are fixed on two parts of the second pull wire that move along a Y direction and are located at another two opposite sides of the through-hole area, respectively; the X direction and the Y direction being perpendicular to each other and parallel to a plane of the base plate.

18. The garbage bag closing and sealing mechanism according to claim 15, wherein the at least one bag opening closure rod is two bag opening closure rods and the at least one hot pressing rod is one hot pressing rod; the two bag opening closure rods are driven by the first pull wire to move towards each other, and close the garbage bag at a middle position of the garbage inlet channel; the base plate is provided with an electric heating rod at a position corresponding to the hot pressing rod, the electric heating rod is provided with an electric heating wire, and the hot pressing rod is provided with an elastomer; the second pull wire drives the hot pressing rod to move to the position of the electric heating rod, so as to press the closed garbage bag against the electric heating wire on the electric heating rod to complete heat sealing and cut-off of the garbage bag.

* * * * *